(12) United States Patent
Beger et al.

(10) Patent No.: US 12,469,398 B2
(45) Date of Patent: Nov. 11, 2025

(54) AUTOMATED DATA PARSING AND CONVERSION FOR EFFICIENT VISUALIZATIONS

(71) Applicant: THE BOEING COMPANY, Arlington, VA (US)

(72) Inventors: Michal Beger, Gdansk (PL); Agnieszka Katarzyna Mank, Gdansk (PL); Mateusz Adamczak, Gdynia (PL); Michal Pilarski, Gdansk (PL); Mateusz Tarczynski, Busko-Zdroj (PL); Konrad Biczkowski, Straszyn (PL); Pawel Karnasiewicz, Gdansk (PL)

(73) Assignee: The Boeing Company, Arlington, VA (US)

( * ) Notice: Subject to any disclaimer, the term of this patent is extended or adjusted under 35 U.S.C. 154(b) by 237 days.

(21) Appl. No.: 18/160,797

(22) Filed: Jan. 27, 2023

(65) Prior Publication Data

US 2024/0257652 A1 Aug. 1, 2024

(51) Int. Cl.
*G08G 5/50* (2025.01)
*G06F 3/0484* (2022.01)
*G06F 40/177* (2020.01)
*G06F 40/205* (2020.01)
*G08G 5/55* (2025.01)

(52) U.S. Cl.
CPC ............ *G08G 5/50* (2025.01); *G06F 3/0484* (2013.01); *G06F 40/177* (2020.01); *G06F 40/205* (2020.01); *G08G 5/55* (2025.01)

(58) Field of Classification Search
CPC .. G08G 5/0047; G08G 5/0013; G08G 5/0021; G08G 5/0026; G08G 5/50; G08G 5/55; G08G 5/21; G08G 5/22; G08G 5/26; G06F 3/0484; G06F 40/177; G06F 40/205
See application file for complete search history.

(56) References Cited

U.S. PATENT DOCUMENTS

| | | | | |
|---|---|---|---|---|
| 10,878,705 | B1 * | 12/2020 | Morowsky | G08G 5/21 |
| 2013/0027226 | A1 * | 1/2013 | Cabos | G08G 5/26 340/961 |
| 2019/0272665 | A1 * | 9/2019 | X | G06T 15/08 |
| 2023/0280187 | A1 * | 9/2023 | Thierbach | G08G 5/20 701/532 |

OTHER PUBLICATIONS

"Extract Locations From Document (Conversion)," esri: ArcGIS Pro, Date Accessed: Jan. 31, 2023, pp. 1-9 https://pro.arcgis.com/en/pro-app/latest/tool-reference/conversion/extract-locations-from-document.htm.

* cited by examiner

*Primary Examiner* — Behrang Badii
(74) *Attorney, Agent, or Firm* — Harrity & Harrity, LLP (57) ABSTRACT

The present disclosure provides techniques for efficient data parsing and conversion for enhanced visualization. Notice data indicating an airspace status relating to one or more flight operations is accessed, and the notice data is parsed based on a plurality of defined formats to identify one or more locations indicated in the notice data, where each respective defined format of the plurality of defined formats indicates how locations are structured in a respective type of notice data. One or more sets of geographical coordinates are generated for the one or more locations based at least in part on the plurality of defined formats. A map of a geographic region, comprising one or more points at the generated one or more sets of geographical coordinates, is output via a graphical user interface.

20 Claims, 5 Drawing Sheets

AUTOMATED DATA PARSING AND CONVERSION FOR EFFICIENT VISUALIZATIONS

FIELD

Aspects of the present disclosure relate to data parsing and conversion. More particularly, the present disclosure relates to automated parsing and/or converting data to drive efficient and improved visualizations.

BACKGROUND

In commercial and private aviation, it is generally important to be aware of a wide variety of information relating to flight operations, such as any abnormal statuses, as well as information relating to the establishment/beginning of, current condition of, and/or change in condition for any region, facility, service, procedure, hazard, and the like. For example, information relating to events such as runway closures, natural hazards (e.g., due to volcanic activity), artificial hazards (e.g., due to skydivers in an area), and the like may be conveyed to pilots or other flight personnel in order to ensure flight operations proceed safely. There are a wide variety of sources and techniques used to convey such information, each having unique aspects. Generally, aggregating and evaluating all such sources is difficult or impossible to perform in a timely manner. Moreover, such information is frequently provided as text, preventing effective and efficient understanding of the information.

SUMMARY

In one aspect of the present disclosure, a method is provided. The method includes: accessing notice data indicating an airspace status relating to one or more flight operations; parsing the notice data based on a plurality of defined formats to identify one or more locations indicated in the notice data, wherein each respective defined format of the plurality of defined formats indicates how locations are structured in a respective type of notice data; generating one or more sets of geographical coordinates for the one or more locations based at least in part on the plurality of defined formats; and outputting, via a graphical user interface (GUI), a map of a geographic region, comprising one or more points at the generated one or more sets of geographical coordinates.

In one aspect, in combination with any example method above or below, the method further comprises, in response to receiving an approval via the GUI: exporting the generated one or more sets of geographical coordinates to a file; and outputting the file.

In one aspect, in combination with any example method above or below, the file corresponds to a geospatial vector data format.

In one aspect, in combination with any example method above or below, the method further comprises outputting a text file comprising the one or more sets of geographical coordinates.

In one aspect, in combination with any example method above or below, the notice data comprises one or more Notice to Air Missions (NOTAMs).

In one aspect, in combination with any example method above or below, at least one location of the one or more locations is indicated in the notice data using a first coordinate system, and generating the one or more sets of geographical coordinates comprises converting the at least one location from the first coordinate system to a second coordinate system.

In one aspect, in combination with any example method above or below, the first coordinate system corresponds to a bearing and a distance from a defined point.

In one aspect, in combination with any example method above or below, the notice data comprises at least one of text data or tabular data.

In one aspect, in combination with any example method above or below, at least a first format of the plurality of defined formats comprises a regular expression.

The present disclosure provides a system in one aspect. The system includes a processor, a memory storage device including instructions that when executed by the processor enable performance of an operation in accordance with any combination of the above methods.

The present disclosure provides a computer program product in one aspect, the computer program product including a computer-readable storage medium having computer-readable program code embodied therewith, the computer-readable program code executable by one or more computer processors to perform an operation in accordance with any combination of the above methods.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to automated data parsing and conversion.

In some embodiments, notice information from a variety of sources can be efficiently parsed to identify and extract the relevant location information, which can be processed and/or converted to enable effective aggregation and/or output of the information, such as via a graphical user interface (GUI). For example, in some embodiments, information relating to various hazards or conditions, such as included in Notice to Air Missions (NOTAMs), can be parsed to extract the relevant location(s) of the conditions. These locations can then be converted or processed to generate coordinate information in a geographic coordinate system (e.g., latitude and longitude). These identified/converted coordinates can then be readily output, such as by generating and displaying points, lines, and/or shapes on a map or globe in the relevant location(s).

In some embodiments, the system uses a set of defined formats or structures to identify the relevant information in a variety of data sources. For example, various rules or formats may be defined (e.g., using regular expressions) to extract the relevant location information from any number and variety of source formats, enabling the system to readily convert the received location information to a uniform or target coordinate system. This allows for rapid collection and/or visualization of data from any number and combination of different sources. Additionally, in some embodiments, new data sources can be efficiently used by the system by defining new formats or rules (e.g., by a user or administrator), allowing the system to adapt to any changing or new standards or formats.

In some embodiments, the notice information can be provided as textual information (e.g., from a NOTAM), tabular information (e.g., a spreadsheet or table of data), and the like. Advantageously, in some aspects, multiple points or locations can be provided simultaneously (e.g., all points specified in a NOTAM), rather than manually providing and/or evaluating each location independently. This substantially reduces the latency of the system, as well as reducing or eliminating the potential for manual error. In this way, the system is able to provide effective visualizations rapidly and efficiently, improving information uptake and preventing or reducing a wide variety of potential issues. For example, in conventional systems, the user (e.g., a pilot) may be unaware of one or more hazards (e.g., because of the variety and complexity of conventional notice information), or may mistakenly believe a hazard is located in a different location, is present at a different time, and the like. However, by using embodiments of the present disclosure, accurate information can be provided automatically and rapidly to the relevant user(s). This substantially reduces the risk of flight operations.

Figure 1:
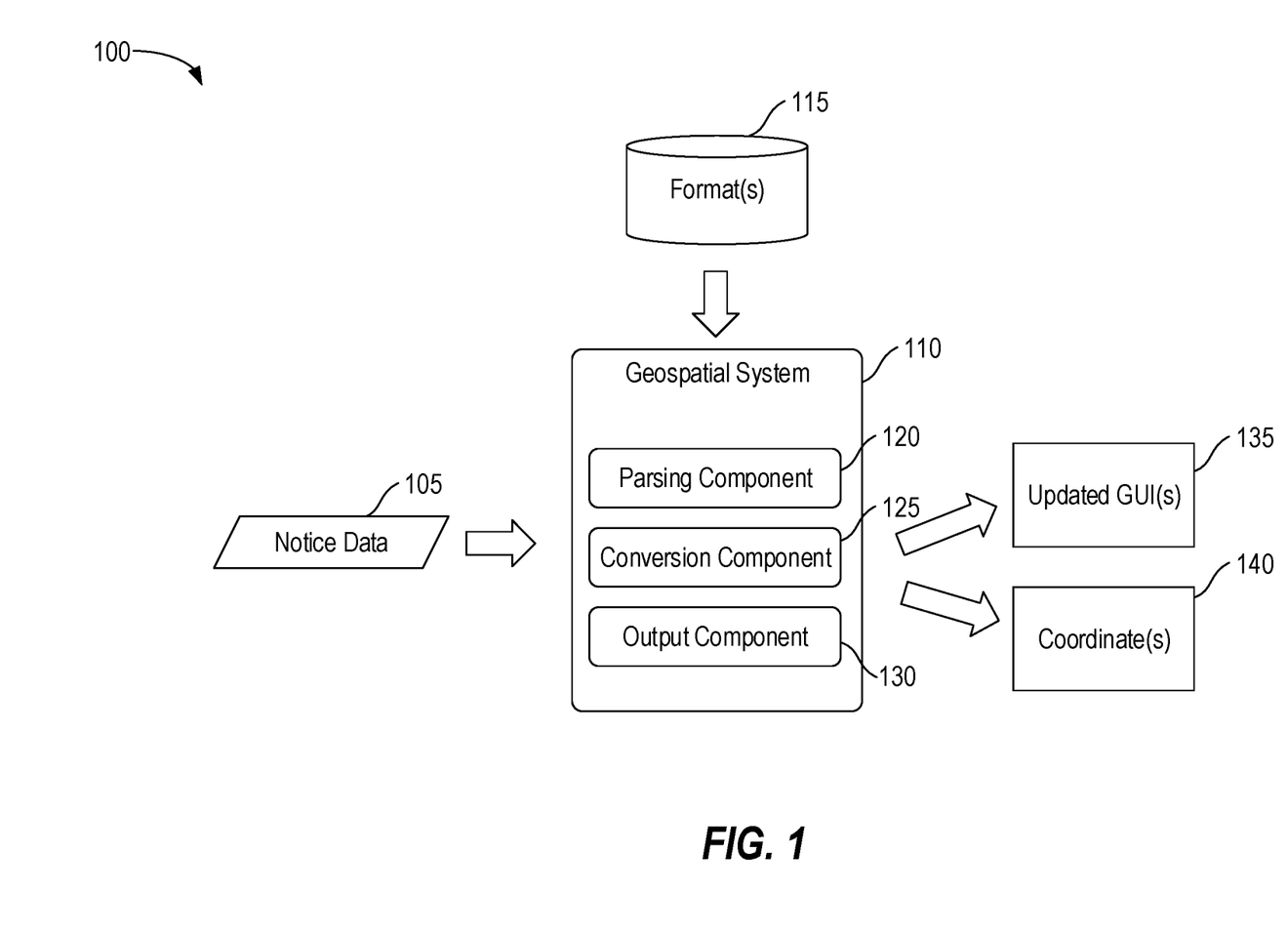
FIG. 1 depicts an example workflow for automated data parsing and conversion to generate visualizations.

FIG. 1 depicts an example workflow 100 for automated data parsing and conversion to generate visualizations.

In the illustrated workflow 100, notice data 105 is accessed by a geospatial system 110 which evaluates the notice data 105 using a set of formats 115 to generate one or more updated GUIs 135 and coordinates 140. Though depicted as a discrete computing system for conceptual clarity, in embodiments, the geospatial system 110 may be implemented as a standalone system, as part of a distributed system (e.g., with some operations being performed by one system or device and other operations being performed by another system or device), or as one part of a broader system. Further, the geospatial system 110 may be implemented using hardware, software, or a combination of hardware and software. For example, in at least one embodiment, the geospatial system 110 is a cloud-based application.

The notice data 105 generally indicates the status(es) of one or more airspaces with respect to one or more flight operations. As used herein, airspace status may refer to a wide variety of natural or artificial states of the air and/or ground in a location or region, such as weather conditions, hazards, events, obstacles, and the like. As used herein, flight operations generally refer to the operations of one or more airborne objects (which may include human-piloted objects as well as autonomous or remote-controlled objects, as well as uncontrolled objects), such as airplanes, helicopters, skydivers, hot air balloons, weather balloons, airships, and the like. For example, one artificial airspace status relating to an airplane flight operation may include the closure of a runway at an airport, such that airplanes must use other runway(s) for takeoff and landing. As another example, a natural airspace status relating to a balloon flight operation may include a thunderstorm or other intense weather system.

In some embodiments, the notice data 105 comprises textual data. For example, the notice data 105 may comprise text from one or more NOTAMs, comma-separated values (CSV) formatted text files, and the like. In some embodiments, the notice data 105 may additionally or alternatively comprise other data, such as tabular data (e.g., in a spreadsheet).

In some embodiments, the notice data 105 is provided by a user. For example, a user may copy the contents of one or more NOTAMs into a GUI that provides the input data to the geospatial system 110. In some embodiments, the notice data 105 may additionally or alternatively be automatically provided to or accessed by the geospatial system 110. For example, the geospatial system 110 may subscribe to one or more sources of notice data 105 to receive updated data when it is available, and/or may request updated data periodically or upon the satisfaction of any other criteria.

The formats 115 generally include information about how the notice data 105 may be formatted and/or how to identify and extract the relevant location information from one or more formats or types of notice data 105. For example, the formats 115 may include one or more regular expressions that can be used to parse textual notice data 105 (formatted or structured in a variety of ways) to extract location information. In some aspects, as discussed above, new formats 115 can be defined to allow for new sources of notice data 105 (with new formatting or structure) to be parsed by the geospatial system 110. For example, for a NOTAM format, the formats 115 may include a regular expression such as $[0-9]\{6\}[NS]\{1\}[0-9]\{7\}[EW]\{1\}$ (e.g., six digits between 0 and 9, followed by one character that is either N or S, followed by seven digits between 0 and 9, followed by one character that is either E or W). This format 115 can thereby be used to extract coordinate information from NOTAMs.

In the illustrated example, the geospatial system 110 includes a parsing component 120, a conversion component 125, and an output component 130. Although depicted as discrete components for conceptual clarity, the operations of the depicted components may be combined or distributed among any number of components. As discussed above, the parsing component 120, conversion component 125, and output component 130 may be implemented using hardware, software, or a combination of hardware and software.

In an embodiment, the parsing component 120 may evaluate the notice data 105 using one or more defined formats 115 to identify and extract location information. For example, as discussed above, the parsing component 120 may use regular expressions or other rules or information specified in the formats 115. In some embodiments, the parsing component 120 can select which format(s) 115 to apply based on various information such as the apparent structure of the notice data 105, the source of the notice data 105, a label or tag associated with the notice data 105, and the like. In some embodiments, the parsing component 120 can use all applicable formats 115 to evaluate the notice data 105 in order to ensure that all locations are identified. For example, if the notice data 105 is text data, the parsing component 120 may use all text-based formats 115 to parse it. If the notice data 105 is tabular, the parsing component 120 may use all table-based formats 115 to parse it.

In the illustrated example, the conversion component 125 can optionally convert the location data (extracted by the parsing component 120) from the original coordinate system of the notice data 105 to a target coordinate system used by the geospatial system 110, as indicated in the formats 115. For example, if the geospatial system 110 uses latitude and longitude, the geospatial system 110 may convert the identified locations if they are provided in a different format or coordinate system (e.g., as indicated by the format 115 used to extract the location information).

This may include, for example, converting from a decimal coordinate system (e.g., 38.801 or 38.801 degrees North, −77.064 or 77.064 degrees West) to a degrees, minutes, and seconds coordinate system (e.g., 38° 48' 3.6" N, 77° 3' 50.4" W), or vice versa. As another example, the conversion component 125 may convert from a bearing, distance, and/or offset coordinate system (e.g., where the notice data 105 indicates a given or defined location, such as an aerodrome reference point (ARP), as well as a bearing or heading from that location, a distance from that location, and/or an offset from the point found at the indicated bearing and distance) to a geospatial coordinate system (e.g., latitude and longitude).

In the illustrated example, the output component 130 can facilitate the generation and/or output of updated GUIs 135 and/or coordinates 140. For example, the updated GUIs 135 may be provided as information or data used to generate a GUI on a user device. As an example, the updated GUIs 135 may include a set of one or more points, lines, or shapes that can be displayed/superimposed on a map of the relevant location. For example, the output component 130 may specify the location or coordinate of each point, allowing a user device to plot or place them on a map and output it via a display. The updated GUI 135 can generally correspond to any visual representation of the detected and/or converted locations/states indicated in the notice data 105.

The coordinates 140 can generally correspond to geographical coordinates (e.g., each having a latitude and longitude) indicating the relevant geographic point(s) in space, and include the detected and/or converted location information in a non-visual representation. In some embodiments, the output component 130 may export coordinate information to a file and provide this file for use by other applications or systems. For example, the coordinates 140 may include a text file (e.g., a CSV file) and/or a tabular file indicating the detected and/or converted locations. In at least one embodiment, the coordinates 140 correspond to a geospatial vector data format (such as a shapefile format) that can be used by various geographic information systems (GIS).

Figure 2:
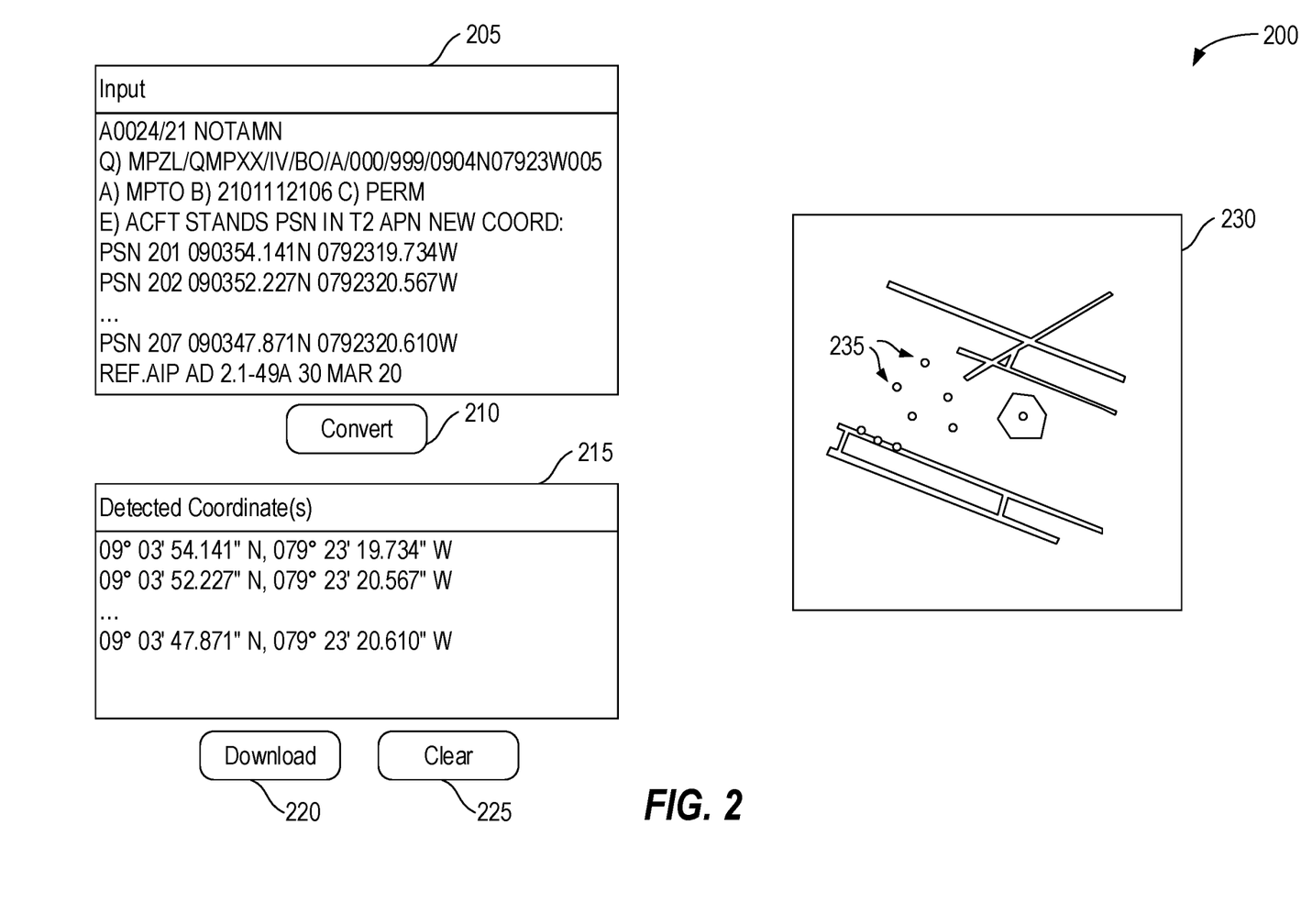
FIG. 2 depicts an example graphical user interface for data parsing and conversion.

FIG. 2 depicts an example graphical user interface (GUI) 200 for data parsing and conversion.

In some embodiments, the GUI 200 is provided via a user device, such as a smartphone, a laptop computer, a desktop computer, a display integrated into an aircraft, and the like. For example, the user device may interact with a remote geospatial system such as geospatial system 110 of FIG. 1 (e.g., via one or more application programming interfaces (APIs) and a cloud-based system) to update the GUI 200. In some embodiments, the GUI 200 may be directly provided by the geospatial system (that is, the parsing and conversions may be performed locally).

In the illustrated example, the GUI 200 includes a first section 205 for input (e.g., to receive notice data such as notice data 105 of FIGS. 1) and a second section 215 for output (e.g., for the detected coordinates, such as coordinates 140 of FIG. 1). Specifically, the section 205 includes a space where textual data can be typed or copied and pasted as input. For example, a user may copy the text of a NOTAM and paste it into the section 205. Although not included in the illustrated example, in some embodiments, the GUI 200 may additionally or alternatively include other input features, such as a button or other section to upload or import files (e.g., text files and/or tabular files), and the like. As indicated by the ellipses in the input section 205, the input may generally be any length or size. That is, the input may include any number of locations or coordinates (rather than requiring that the user manually enter each location/coordinate separately).

Further, as illustrated, a wide variety of data, beyond mere coordinates or location information, can be provided to the input section 205. That is, the user (or other data source) need not manually extract the location information, and can copy the entire text data (or other data) into the section 205. For example, in the case of NOTAM data, the non-coordinate information can include data such as a qualifier line, an International Civil Aviation Organization (ICAO) location indicator of the aerodrome or flight information region (FIR) in which the facility, airspace, or condition being reported is located, the effective date(s) and/or time(s), the expiration date(s) and/or time(s), a schedule of the condition, altitude(s) of the condition, and the like. By using defined formats, the geospatial system is able to efficiently extract the relevant coordinate information from the larger body of text.

In the illustrated example, the GUI 200 includes a selectable button 210 to import/convert the data in the input section 205. For example, the convert button 210 may cause the geospatial system to begin parsing/converting the input data. In some aspects, rather than using a discrete convert button 210, the geospatial system may use other triggers such as automatically beginning conversion when the data is provided (e.g., as text is entered line-by-line, or when a file is uploaded).

In the illustrated GUI 200, the output section 215 indicates the coordinate(s) detected in the input data. As illustrated, the output coordinates are generally extracted from the input (e.g., the superfluous components of the input data are not included), as well as formatted according to a target format (which may be the target format of the geospatial system itself, or may be a user-selectable target format). In the specific depicted example, the input data is formatted as a NOTAM and the coordinate information is concatenated together without delineating the degrees, minutes and seconds. In the output section 215, appropriate spacing and labels have been inserted to make the output more readable to a user.

In the illustrated example, in addition to generating the output coordinates, the GUI 200 is also updated to depict points 235 on a map 230 of a geographic region. Specifically, for each location/coordinate found in the input data (and output via the section 215), a corresponding point 235 is generated and inserted or superimposed on the map 230. In some embodiments, the geospatial system can identify the general area or geographic region based on the determined coordinates themselves and/or based on other information (such as the FIR specified in the NOTAM). The points 235 can then be added to the map based on their coordinates. That is, for each extracted coordinate, a corresponding point 235 can be generated and inserted into/superimposed onto the map 230 at the corresponding location. Generally, the map 230 may comprise a drawn or rendered map, and/or may include other data such as imagery (e.g., satellite imagery), terrain data (e.g., elevation lines), flight data (e.g., indicating flight paths or corridors), legal data (e.g., boundaries or borders), and the like. In the illustrated example, the map 230 depicts an airport with several runways, a central terminal, and points 235 scattered in various places (e.g., to indicate closures, ground activities, and the like).

In some embodiments, the map 230 and points 235 are output to allow the user to quickly review a visualization of the results of the parsing/conversion to ensure it is reasonable. For example, the user may verify that the points 235 are within an expected region (e.g., the region indicated in the original NOTAM), that there are no extraneous points located outside of the region, and the like.

In some embodiments, in addition extracting the coordinates themselves, the geospatial system can extract other information for each location/coordinate, such as the type of the location, the condition or state specified for the location/coordinate, the timeframe for the condition or state, and the like.

As illustrated by button 220, the user can then download or export the converted coordinates (e.g., indicated in section 215 and map 230). In some embodiments, the geospatial system outputs the data in a given target format, which may be the default of the geospatial system and/or be a user-selectable format. For example, the geospatial system may output the coordinates in tabular format, in a CSV or other textual format, and the like. In at least one embodiment, as discussed above, the geospatial system outputs the data in a geospatial vector format, such as a shapefile. This output can then be imported to other applications and programs (e.g., GIS programs). In some embodiments, in addition to or instead of outputting the vector format, the geospatial system can optionally output a text file indicating the coordinates.

In the depicted example, button 225 can be used to clear the data from the GUI 200. For example, upon selecting the button 225, the input section 205, output section 215, and map 230 may be cleared (e.g., the text in the sections 205 and 215 may be removed, and the points 235 may be removed). The user can then readily insert new data (e.g., copying a new NOTAM) into the section 205, allowing them to rapidly process, evaluate, or review the data and generate corresponding exported coordinate files.

Figure 3:
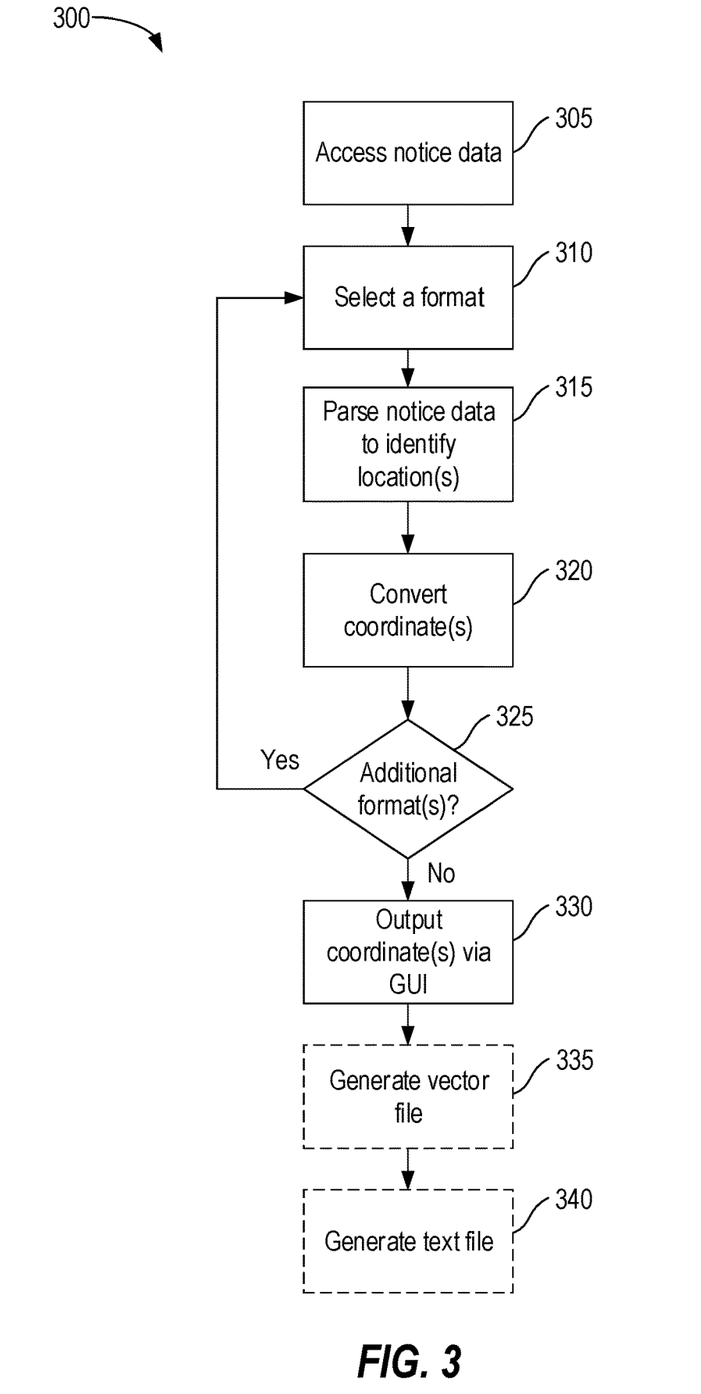
FIG. 3 is a flow diagram depicting an example method for data parsing and conversion to enhance visualizations.

FIG. 3 is a flow diagram depicting an example method 300 for data parsing and conversion to enhance visualizations. In some embodiments, the method 300 is performed by a geospatial system, such as the geospatial system 110 of FIG. 1.

At block 305, the geospatial system accesses notice data (e.g., notice data 105 of FIG. 1). As discussed above, the notice data generally indicates the status of the airspace and/or ground, relevant to one or more flight operations, at one or more locations. For example, the notice data may indicate airspace status such as hazards or conditions, runway closures, lawn-mowing operations adjacent to runways, and the like. As used herein, accessing data can generally include receiving it, requesting it, retrieving it, or otherwise gaining access to it. That is, as discussed above, the notice data may be received as input from a user, may be requested or retrieved from a data source such as via one or more APIs, may be provided by or received from a data source (e.g., using an API), and the like.

At block 310, the geospatial system selects a format from a set of defined formats (e.g., formats 115 of FIG. 1) supported by the geospatial system. For example, as discussed above, each format may include information relating to how the data should be parsed to identify, extract, and/or convert coordinate information (e.g., using regular expressions). Generally, the geospatial system may select the format using any suitable technique, as all such formats may be used during execution of the method 300. That is, as all alternative formats can be used to process the input notice data, they may be evaluated in any order in some embodiments.

At block 315, the geospatial system parses the accessed notice data to identify any indicated location(s) based on the selected format. For example, as discussed above, the geospatial system may use a regular expression to identify locations in textual notice data (e.g., NOTAMs).

At block 320, the geospatial system can optionally convert any identified locations from the source coordinate system to a target coordinate system, if needed. For example, as discussed above, the geospatial system may convert bearing and distance coordinates to latitude and longitude, convert decimal latitude and longitude to degrees/minutes/seconds coordinates, and the like.

At block 325, the geospatial system determines whether there is at least one additional format, from the set of defined formats, that has not-yet been used to parse the notice data. If so, the method 300 returns to block 310. If not, the method 300 continues to block 330. Although the illustrated example depicts a sequential process for conceptual clarity (e.g., selecting and processing each format in sequence), in some embodiments, some or all of the formats may be processed/used to parse the notice data in parallel.

At block 330, the geospatial system outputs the detected and/or converted coordinate(s) via a GUI (e.g., the GUI 200 of FIG. 2). For example, as discussed above, the coordinates may be used to generate point(s) on a map of the relevant region. As discussed above, this may allow a user to readily determine whether the parsing was completed successfully.

At block 335, the geospatial system can optionally generate a vector file for the extracted/converted coordinates (e.g., a shapefile), as discussed above. For example, in response to receiving user input approving the output (e.g., using button 220 of FIG. 2), the geospatial system may export the coordinates to a vector file which can be used to import the information to various other applications and programs.

At block 340, the geospatial system can similarly optionally generate a text file for the extracted/converted coordinates. This may include, for example, a CSV file, a simple list of coordinates, and the like.

In this way, the geospatial system can provide improved data parsing, conversion, and visualization to significantly improve the operations of downstream applications and programs and reduce the risk of error.

Figure 4:
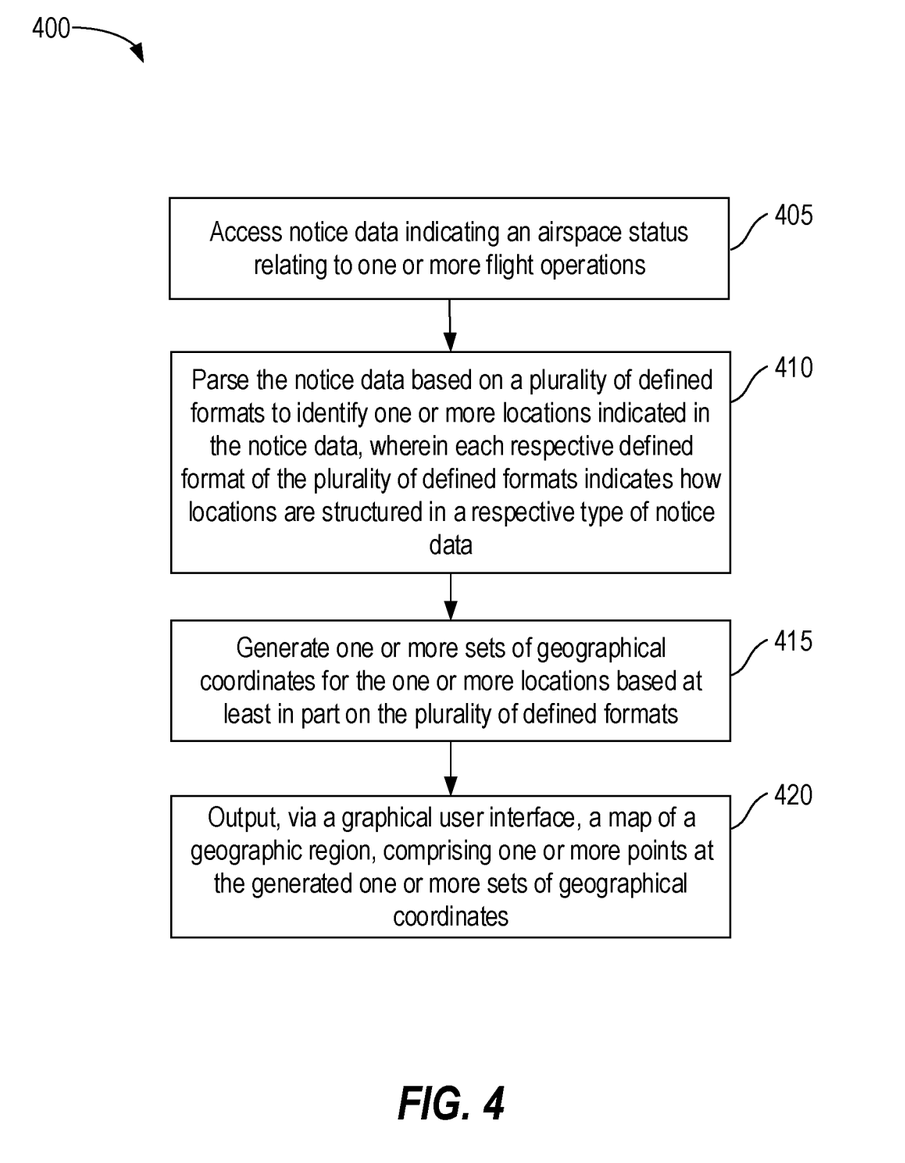
FIG. 4 is a flow diagram depicting an example method for parsing notice data to output points on maps displayed via GUIs.

FIG. 4 is a flow diagram depicting an example method 400 for parsing notice data to output points on maps displayed via GUIs.

At block 405, notice data (e.g., notice data 105 of FIG. 1) indicating an airspace status relating to one or more flight operations is accessed.

At block 410, the notice data is parsed based on a plurality of defined formats (e.g., formats 115 of FIG. 1) to identify one or more locations indicated in the notice data, wherein each respective defined format of the plurality of defined formats indicates how locations are structured in a respective type of notice data.

At block 415, one or more sets of geographical coordinates (e.g., coordinates 140 of FIG. 1) are generated for the one or more locations based at least in part on the plurality of defined formats.

At block 420, a map of a geographic region, comprising one or more points at the generated one or more sets of geographical coordinates, is output via a graphical user interface (e.g., updated GUI(s) 135 of FIG. 1 and/or map 230 of FIG. 2).

Figure 5:
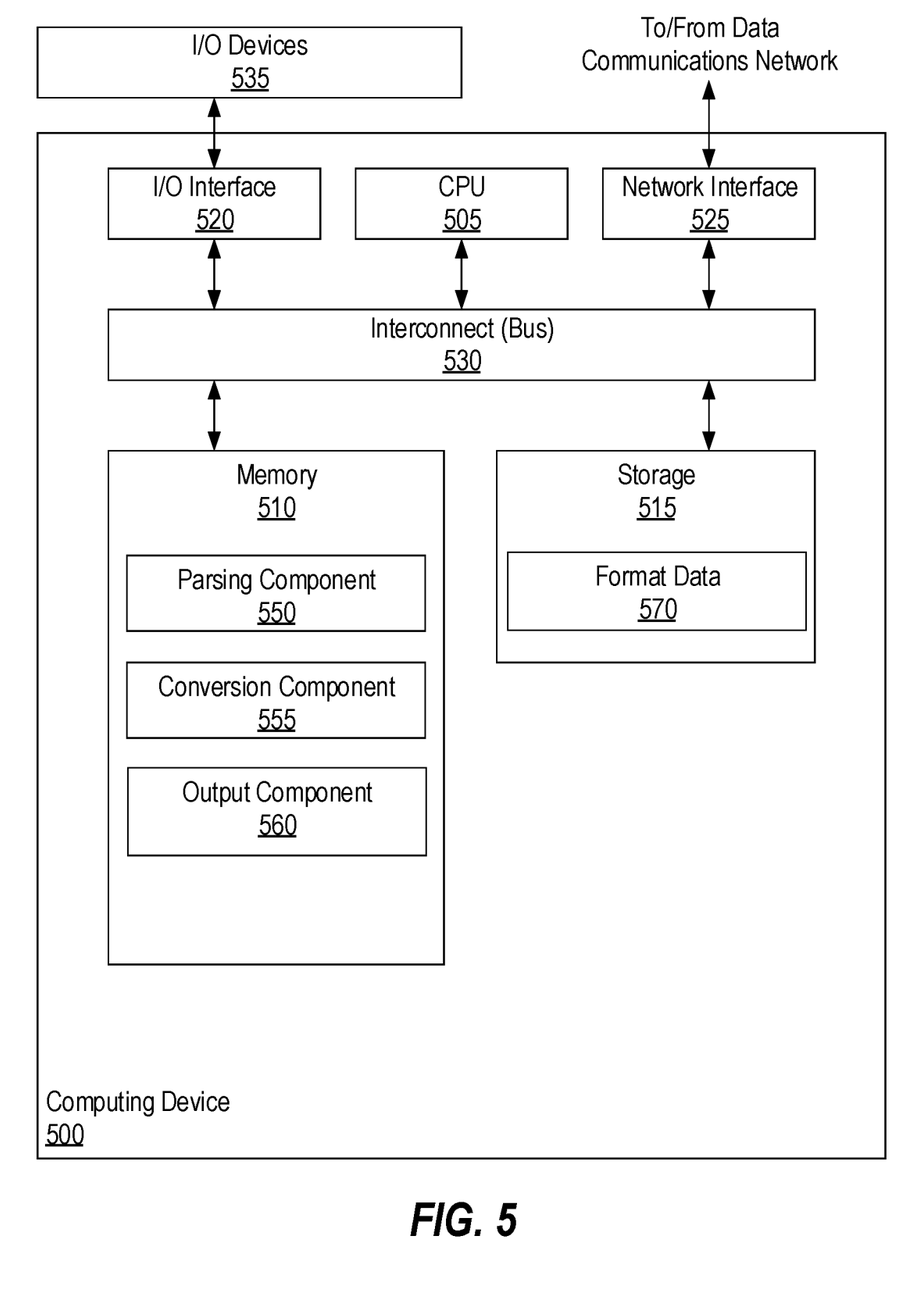
FIG. 5 depicts an example computing device, according to one or more aspects of the present disclosure.

FIG. 5 depicts an example computing device 500, according to one or more aspects of the present disclosure. Although depicted as a physical device, in aspects, the computing device 500 may be implemented using virtual device(s), and/or across a number of devices (e.g., in a cloud environment). In one aspect, the computing device 500 corresponds to a geospatial system, such as the geospatial system 110 of FIG. 1.

As illustrated, the computing device 500 includes a CPU 505, memory 510, storage 515, a network interface 525, and one or more I/O interfaces 520. In the illustrated aspect, the CPU 505 retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally included to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, I/O devices 535 (such as keyboards, monitors, etc.) are connected via the I/O interface(s) 520. Further, via the network interface 525, the computing device 500 can be communicatively coupled with one or more other devices and components (e.g., via a network, which may include the Internet, local network(s), and the like). As illustrated, the CPU 505, memory 510, storage 515, network interface(s) 525, and I/O interface(s) 520 are communicatively coupled by one or more buses 530.

In the illustrated aspect, the memory 510 includes a parsing component 550, a conversion component 555, and an output component 560, which may perform one or more aspects discussed above. Although depicted as discrete components for conceptual clarity, in aspects, the operations of the depicted components (and others not illustrated) may be combined or distributed across any number of components. Further, although depicted as software residing in memory 510, in aspects, the operations of the depicted components (and others not illustrated) may be implemented using hardware, software, or a combination of hardware and software.

In one aspect, the parsing component 550 (which may correspond to the parsing component 120 of FIG. 1) is used to parse notice data in order to extract locations/coordinates, as discussed above. The conversion component 555 (which may correspond to the conversion component 125 of FIG. 1) may be used to convert the extracted coordinates to a target coordinate system (if needed), as discussed above. The output component 560 (which may correspond to the output component 130 of FIG. 1) may be used to export the converted coordinate(s) to one or more files (e.g., vector files, text files, and the like) for output, as discussed above.

In the illustrated example, the storage 515 includes format data 570 (which may correspond to the formats 115 of FIG. 1). That is, the format data 570 may include rules, formats, transformations, and the like for one or more notice data sources to allow the computing device 500 to efficiently parse the data and generate output coordinates. Although depicted as residing in storage 515, the format data 570 may be stored in any suitable location, including memory 510.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
    providing a graphical user interface (GUI) that includes:
        a first section configured for inputting notice data indicating an airspace status relating to one or more flight operations, and
        a second section configured for outputting detected coordinates:
    receiving an input of the notice data via the first section of the GUI;
    parsing the notice data, based on an apparent structure of the notice data and based on a plurality of defined formats, to identify one or more locations indicated in the notice data,
    wherein each respective defined format of the plurality of defined formats indicates how locations are structured in a respective type of notice data, and
    wherein a plurality of formats of a first type are used to parse the notice data based on the first type corresponding to the notice data;
    extracting, from the notice data, a type of the one or more locations, a condition for the one or more locations, and a timeframe for the condition;
    generating one or more sets of geographical coordinates for the one or more locations based at least in part on the plurality of defined formats;
    identifying a geographic region based on the one or more sets of geographical coordinates and a flight information region associated with the notice data; and
    generating an update to the GUI based on data identifying the one or more sets of geographical coordinates, wherein the update to the GUI includes:
        an indication of the one or more sets of geographical coordinates in the second section, wherein the indication of the one or more sets of geographical coordinates is formatted according to a target format, and
        a map of the geographic region comprising one or more points at the generated one or more sets of geographical coordinates.

2. The method of claim 1, further comprising, in response to receiving an approval via the GUI:
    exporting the generated one or more sets of geographical coordinates to a file; and
    outputting the file.

3. The method of claim 2, wherein the file corresponds to a geospatial vector data format.

4. The method of claim 3, further comprising outputting a text file comprising the one or more sets of geographical coordinates.

5. The method of claim 1, wherein the notice data comprises one or more Notice to Air Missions (NOTAMs).

6. The method of claim 1, wherein:
    at least one location of the one or more locations is indicated in the notice data using a first coordinate system, and
    generating the one or more sets of geographical coordinates comprises converting the at least one location from the first coordinate system to a second coordinate system.

7. The method of claim 6, wherein the first coordinate system corresponds to a bearing and a distance from a defined point.

8. The method of claim 1, wherein the notice data comprises at least one of text data or tabular data.

9. The method of claim 1, wherein at least a first format of the plurality of defined formats comprises a regular expression.

10. A system, comprising:
    a processor;
    a memory storage device including instructions that when executed by the processor enable performance of an operation comprising:
        providing a graphical user interface (GUI) that includes:
            a first section configured for inputting notice data indicating an airspace status relating to one or more flight operations, and
            a second section configured for outputting detected coordinates:
        receiving an input of the notice data via the first section of the GUI;
        parsing the notice data, based on an apparent structure of the notice data and based on a plurality of defined formats, to identify one or more locations indicated in the notice data,
        wherein each respective defined format of the plurality of defined formats indicates how locations are structured in a respective type of notice data, and
        wherein a plurality of formats of a first type are used to parse the notice data based on the first type corresponding to the notice data;

extracting, from the notice data, a type of the one or more locations, a condition for the one or more locations, and a timeframe for the condition;

generating one or more sets of geographical coordinates for the one or more locations based at least in part on the plurality of defined formats;

identifying a geographic region based on the one or more sets of geographical coordinates and a flight information region associated with the notice data; and generating an update to the GUI based on data identifying the one or more sets of geographical coordinates, wherein the update to the GUI includes:

an indication of the one or more sets of geographical coordinates in the second section, wherein the indication of the one or more sets of geographical coordinates is formatted according to a target format, and a map of the geographic region comprising one or more points at the generated one or more sets of geographical coordinates.

11. The system of claim 10, the operation further comprising, in response to receiving an approval via the GUI:

exporting the generated one or more sets of geographical coordinates to a geospatial vector data format file;

outputting the geospatial vector data format file; and outputting a text file comprising the one or more sets of geographical coordinates.

12. The system of claim 10, wherein:

at least one location of the one or more locations is indicated in the notice data using a first coordinate system, and generating the one or more sets of geographical coordinates comprises converting the at least one location from the first coordinate system to a second coordinate system.

13. The system of claim 12, wherein the first coordinate system corresponds to a bearing and a distance from a defined point.

14. The system of claim 10, wherein the notice data comprises at least one of text data or tabular data.

15. The system of claim 10, wherein at least a first format of the plurality of defined formats comprises a regular expression.

16. A computer program product, the computer program product comprising a non-transitory computer-readable storage medium having computer-readable program code embodied therewith, the computer-readable program code executable by one or more computer processors to perform an operation, the operation comprising:

providing a graphical user interface (GUI) that includes:

a first section configured for inputting notice data indicating an airspace status relating to one or more flight operations, and a second section configured for outputting detected coordinates:

receiving an input of the notice data via the first section of the GUI;

parsing the notice data, based on an apparent structure of the notice data and based on a plurality of defined formats, to identify one or more locations indicated in the notice data, wherein each respective defined format of the plurality of defined formats indicates how locations are structured in a respective type of notice data, and wherein a plurality of formats of a first type are used to parse the notice data based on the first type corresponding to the notice data;

extracting, from the notice data, a type of the one or more locations, a condition for the one or more locations, and a timeframe for the condition;

generating one or more sets of geographical coordinates for the one or more locations based at least in part on the plurality of defined formats;

identifying a geographic region based on the one or more sets of geographical coordinates and a flight information region associated with the notice data; and generating an update to the GUI based on data identifying the one or more sets of geographical coordinates, wherein the update to the GUI includes:

an indication of the one or more sets of geographical coordinates in the second section, wherein the indication of the one or more sets of geographical coordinates is formatted according to a target format, and a map of the geographic region comprising one or more points at the generated one or more sets of geographical coordinates.

17. The computer program product of claim 16, wherein the operation further comprising, in response to receiving an approval via the GUI:

exporting the generated one or more sets of geographical coordinates to a file; and outputting the file.

18. The computer program product of claim 16, wherein:

at least one location of the one or more locations is indicated in the notice data using a first coordinate system, and generating the one or more sets of geographical coordinates comprises converting the at least one location from the first coordinate system to a second coordinate system.

19. The computer program product of claim 16, wherein the notice data comprises at least one of text data or tabular data.

20. The computer program product of claim 16, wherein at least a first format of the plurality of defined formats comprises a regular expression.

* * * * *